United States Patent [19]
Heikkinen et al.

[11] Patent Number: 5,146,081
[45] Date of Patent: Sep. 8, 1992

[54] SWITCHING CIRCUIT FOR A CONTACT DISPLAY PANEL

[75] Inventors: Kari Heikkinen, Äänekoski; Juha Savolainen, Hankasalmi, both of Finland

[73] Assignee: Heikki Marttila Oy, Jyvaskyla, Finland

[21] Appl. No.: 605,311

[22] Filed: Oct. 30, 1990

[30] Foreign Application Priority Data

Mar. 11, 1989 [FI] Finland ............... 895242

[51] Int. Cl.[5] ........................... G01V 9/04
[52] U.S. Cl. ..................... 250/221; 250/222.1
[58] Field of Search ............... 250/221, 222.1, 208.2, 250/208.3; 340/555, 556, 557

[56] References Cited

U.S. PATENT DOCUMENTS 3,764,813 10/1973 Clement et al.
4,703,316 10/1987 Sherbeck.
4,719,339 1/1988 Mizuno ..................... 250/221
4,893,120 1/1990 Doering et al. ............ 250/221

Primary Examiner—David C. Nelms
Attorney, Agent, or Firm—Armstrong & Kubovcik

[57] ABSTRACT

The invention relates to a contact display panel circuitry in which the phototransistors are on two adjacent sides of the contact display panel and the diodes emitting infrared radiation to the phototransistors are on the opposite sides, and in which, under the control of shift registers, each phototransistor in turn is coupled to a common line, the logic circuit of the device being capable of computing the location of a possible contact point on the basis of changes in the signal in the common line. According to the invention the use of controllable switches and numerous resistors and capacitors is avoided by coupling in series with the phototransistor a diode in such a manner that the collector of the phototransistor is coupled to the transfer register and the emitter is coupled via the said diode to the common line.

2 Claims, 2 Drawing Sheets

SWITCHING CIRCUIT FOR A CONTACT DISPLAY PANEL

BACKGROUND OF THE INVENTION

The invention relates to a contact display panel circuitry in which there are phototransistors on two adjacent sides of the contact display panel and on the opposite sides there are diodes emitting infrared light to the transistors, and in which, under the control of shift registers, each phototransistor in turn is switched to the common line.

It is known that contact display panels have a structure in which the phototransistors are located on two adjacent sides of the panel and the diodes emitting infrared light are located on the sides opposite to these sides. The components are arranged so that there is always an infrared diode in alignment with a phototransistor on the opposite side. The imaginary lines interconnecting each pair of a phototransistor and an infrared diode form a grid. The diodes transmit infrared radiation, pulsed continuously or intermittently, to the phototransistors. The basic principle is that, when some point in the display panel is touched by a finger, the infrared radiation to the bases of the phototransistors in the contact line both in the X direction and the Y direction is cut off, whereupon the logic circuit observes the change in their collector or emitter current and is thus capable of computing the coordinates of the contact point.

There is known a circuitry, shown in FIG. 1, in which the phototransistors are coupled via an analog cmos switch to a common line, which leads to the logic circuit. The phototransistors 1 continuously receive supply voltage, and their emitter is coupled to switch K, which for its part is coupled to the common line c. The emitters are also coupled to the ground of the circuit by resistor R. Between the transistors 1 and the switches K there is additionally a differential capacitor C. Infrared diodes (not shown) transmit infrared radiation to the bases of the transistors 1, from which a certain emitter current and emitter voltage follow.

The transfer registers SR transmit at a certain frequency a control pulse, scanned, to each switch K, whereupon the switch K closes. From the emitter of the phototransistor, a pulsed signal, modulated by the infrared beam, is obtained. If a transistor is not receiving infrared radiation, the signal received from its emitter disappears or is considerably reduced. The logic, which also controls the shift registers SR, will now be capable of determining the phototransistors concerned and thus the contact point. The disadvantages of this prior-art circuitry include that a large number of resistors, capacitors and analog switching circuits or the like are needed, and arranging the necessary wiring on a printed circuit card is difficult.

Another known switching method is depicted in FIG. 2, in which the reference numerals are in applicable parts the same as in FIG. 1. In it multiplexer/decoders are used for switching each phototransistor 1 in turn to the line c leading to the common logic. The diodes emitting the infrared radiation which generates the base current of the phototransistors are not shown in the figure. The multiplexer/decoders are controlled by control signals (a, b, c) arriving along the control channel and by the selection signals of the multiplexer/ decoder. The emitter voltage of the phototransistors, which is the voltage effective across the resistor R, is applied via the differential capacitor to the multiplexer. The a, b, c signals of the control channel select in turn the emitter voltage of one phototransistor 1 at a time for being switched to the line c, from the voltage level change of which the logic circuit is capable of identifying the coordinates of the contact point. The disadvantages of this second prior-art method include that the control of the multiplexer/decoders requires a relatively large number of control lines and that the implementation (coding) of the control by means of multiplexer/decoders is more cumbersome than when using shift registers. In this circuitry, also, a large number of resistors and capacitors are used.

SUMMARY OF THE INVENTION

It is the object of the present invention to provide a circuitry in which, by using shift registers, the circuitry is arranged so that no resistors and capacitors need to be used and in which as little wiring as possible is needed. The problem is solved so that there is a diode coupled in series with the phototransistor so that the collector of the phototransistor is coupled to the shift register and the emitter is coupled via the said diode to the common line.

DETAILED DESCRIPTION OF THE PREFERRED EMBODIMENT

Figure 2:
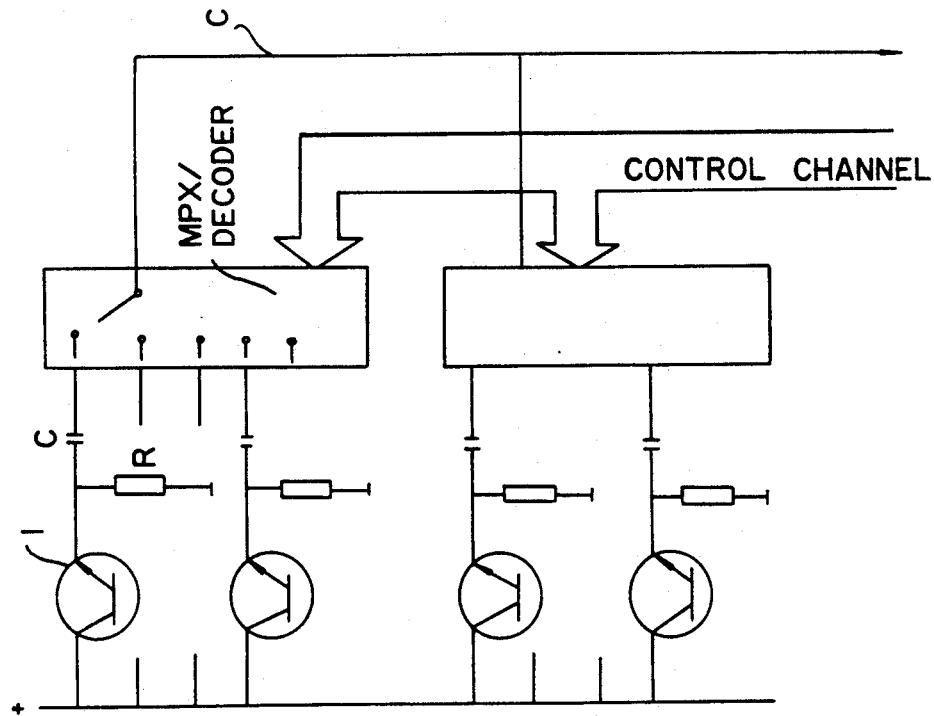
FIG. 2 illustrates another type of prior art circuit arrangement for a contact display panel.
Figure 1:
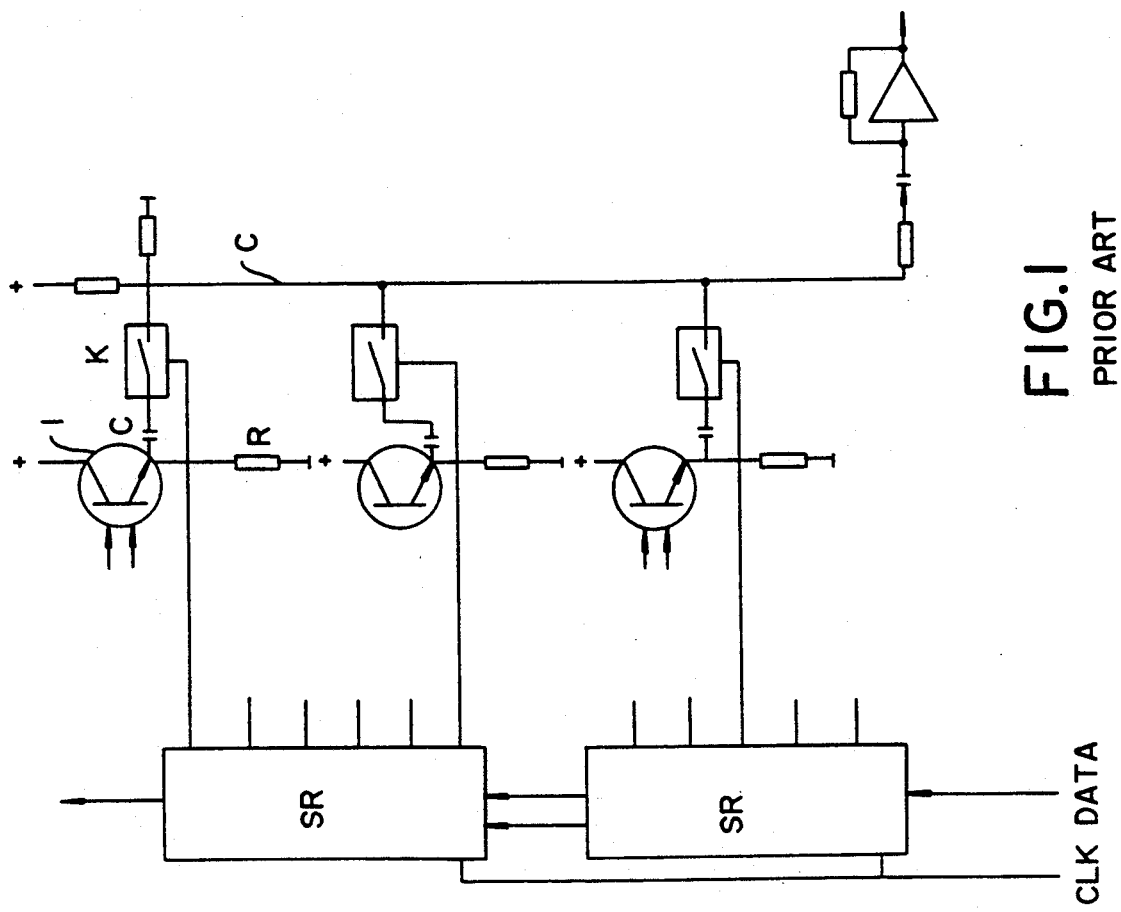
FIG. 1 illustrates one type of prior art circuitry for a contact display panel.
Figure 3:
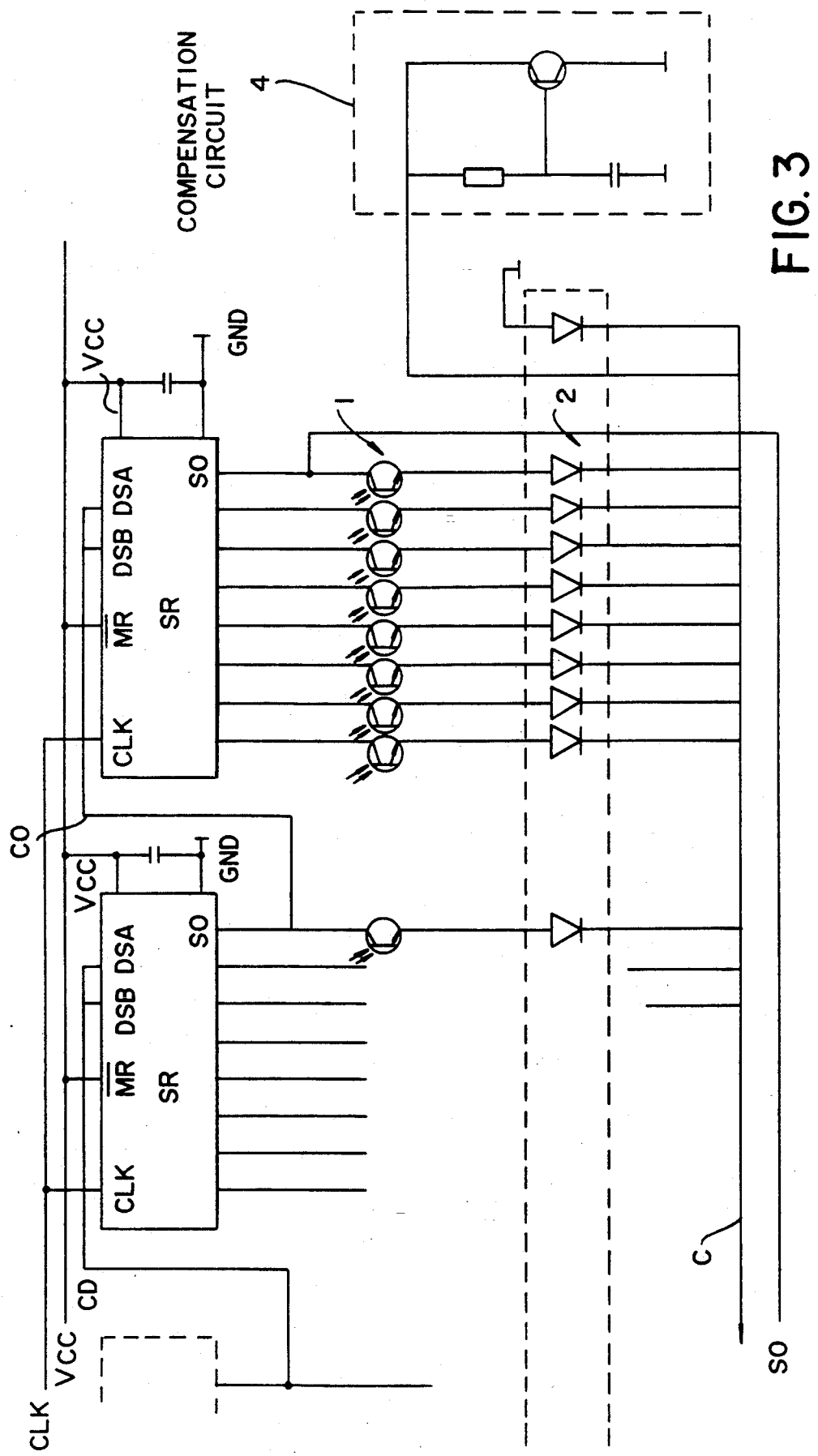
FIG. 3 illustrates circuitry according to the present invention for a contact display panel.

In the circuit arrangement schematically shown in FIGS. 3 and 4, there are used shift registers SR which have a series-form input and a parallel-form output. The inputs of the shift registers 5B are, in a known manner, a clock signal CLK, the supply voltage VCC, the control data CD, which in this example is connected to two inputs DSA and DSB, and the inverted Master Reset MR, which in this example is not active. According to this invention, a phototransistor 1 and in series with it a diode 2 are coupled to each of the series-form outputs of the shift registers. The diodes 2 are all coupled to a common line c, which leads to the logic circuit. The shift register SR gives in succession to each phototransistor 1 a voltage pulse, and the pulse frequency, i.e. the frequency between the adjacent phototransistors, is approx. 1 kHz. When a phototransistor receives voltage, it becomes conductive, and the signal received from the emitter is applied via the diode 2 to the common line c. If the connection between the phototransistor concerned and the diode (not shown) at the same time transmitting infrared radiation is cut off by touching the panel, the effective signal due to modulation will be omitted from the emitter of the phototransistor and a modulation signal will not be switched to the common line c when the phototransistor is active.

For compensating for changes in the direct-voltage level of the line c it is possible to use, for example, the compensation circuit 4 according to the Figure, the operation of which is described in greater detail in Patent Application FI 895243.

The circuitry according to the invention has advantages over the systems according to the state of the art.

In the circuitry, the need for components is reduced, since no separate resistors and capacitors and no controllable switches are needed. The reduction of the number of components and wiring reduces the size of the circuit and increases its reliability.

We claim:

1. A contact display panel circuit for a contact display panel, comprising:

a plurality of phototransistors on two adjacent sides of the contact display panel;

a plurality of first diodes arranged on opposite sides of the contact display panel from respective oppositely disposed ones of said plurality of phototransistors, said plurality of first diodes emitting infrared radiation to oppositely disposed ones of said plurality of phototransistors;

at least one shift register for controlling each of said plurality of phototransistors;

each of said plurality of phototransistors being electrically connected in series with one end of one of a plurality of second diodes;

a common line connecting the other end of each of said second diodes, wherein each of said plurality of second diodes is coupled in series with a corresponding one of said plurality of phototransistors in such a manner that the collector of each of said plurality of phototransistors is coupled to said at least one shift register, and the emitter of each of said plurality of phototransistors is coupled via a respective one of said plurality of second diodes to said common line.

2. A circuit according to claim 1, further comprising a logic circuit, wherein said common line is connected to said logic circuit, said logic circuit having an algorithm for determining a location of any of said plurality of phototransistors for which an interruption has occurred of light from the corresponding one of said first diodes.

* * * * *